(12) United States Patent
Autrey et al.

(10) Patent No.: US 7,963,116 B2
(45) Date of Patent: Jun. 21, 2011

(54) BULK-SCAFFOLDED HYDROGEN STORAGE AND RELEASING MATERIALS AND METHODS FOR PREPARING AND USING SAME

(75) Inventors: S. Thomas Autrey, West Richland, WA (US); Abhijeet J. Karkamkar, Richland, WA (US); Anna Gutowska, Richland, WA (US); Liyu Li, Richland, WA (US); Xiaohong S. Li, Richland, WA (US); Yongsoon Shin, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 12/435,268

(22) Filed: May 4, 2009

(65) Prior Publication Data
US 2009/0258215 A1  Oct. 15, 2009

Related U.S. Application Data

(60) Continuation-in-part of application No. 11/941,549, filed on Nov. 16, 2007, now abandoned, which is a division of application No. 10/778,997, filed on Feb. 12, 2004, now Pat. No. 7,316,788.

(51) Int. Cl.
*H01M 8/06* (2006.01)
*F03G 7/00* (2006.01)
*C01B 3/02* (2006.01)
*C01B 3/04* (2006.01)

(52) U.S. Cl. ............. 60/721; 252/188.25; 423/648.1; 429/416; 429/421

(58) Field of Classification Search ............... 423/648.1; 429/416, 421; 60/721; 252/188.25
See application file for complete search history.

(56) References Cited

U.S. PATENT DOCUMENTS

| | | | |
|---|---|---|---|
| 4,383,837 A | 5/1983 | Smith | |
| 4,433,063 A | 2/1984 | Bernstein et al. | |
| 4,507,263 A | 3/1985 | Ron | |
| 4,716,736 A | 1/1988 | Schwarz | |
| 5,653,951 A | 8/1997 | Rodriguez et al. | |
| 6,589,312 B1 | 7/2003 | Snow et al. | |
| 6,764,552 B1 | 7/2004 | Joyce et al. | |
| 7,316,788 B2 * | 1/2008 | Autrey et al. | 252/182.34 |
| 2004/0077485 A1 | 4/2004 | Purta et al. | |
| 2005/0180916 A1 * | 8/2005 | Autrey et al. | 423/658.2 |
| 2009/0258215 A1 | 10/2009 | Autrey et al. | |

FOREIGN PATENT DOCUMENTS

| | | |
|---|---|---|
| DE | 10211600 A1 | 9/2003 |
| WO | 2005080256 A1 | 9/2005 |

OTHER PUBLICATIONS

Autrey, Tom, et al., Chemical Hydrogen Storage in Nano-Structured Materials. Control of Hydrogen Release and Reactivity From Ammonia Borane Complexes, Prepr. Pap.-Am. Chem. Soc., Div. Fuel Chem., 2004, 49 (1) 150.

(Continued)

*Primary Examiner* — Wayne Langel
(74) *Attorney, Agent, or Firm* — James D. Matheson

(57) ABSTRACT

Compositions are disclosed for storing and releasing hydrogen and methods for preparing and using same. These hydrogen storage and releasing materials exhibit fast release rates at low release temperatures without unwanted side reactions, thus preserving desired levels of purity and enabling applications in combustion and fuel cell applications.

27 Claims, 6 Drawing Sheets

OTHER PUBLICATIONS

Sit, V., et al., The Thermal Dissociation of NH3BH3, Thermochimica Acta, 113 (1987) 379-382.

Hydrogen, Fuel Cells & Infrastructure Technologies Program, Program Overview, Annual Program Review, May 19-22, 2003, Berkeley, CA.

Baitalow, F., et al., Thermal Decomposition of B-H-N. Compounds Investigated by Using Combined Thermoanalytical Methods, Thermochimica Acta 391 (2002), 159-168.

Jaska, Cory A. et al., Transition Metal-Catalyzed Formation of Boron-Nitrogen Bonds: Catalytic Dehydrocoupling of Amine-Borane Adducts to Form Aminoboranes and Borazines, J. Am. Chem. Soc., 2003, 125, 9424-9434.

Wideman, Thomas, et al., Convenient Procedures for the Laboratory Preparation of Borazine, Inorg. Chem. 1995, 34, 1002-1003.

Raissi, Ali, et al., Hydrogen Storage in Ammonia and Aminoborane Complexes, Hydrogen Program Annual Review, Berkeley, CA, May 21, 2002.

Zhao, Dongyuan, et al., Triblock Copolymer Syntheses of Mesoporous Silica with Periodic 50 to 300 Angstrom Pores, Science, vol. 279, Jan. 23, 1998, 548-552.

Zhao, Dongyuan, et al., Nonionic Triblock and Star Diblock Copolymer and Oligomeric Surfactant Syntheses of Highly Ordered, Hydrothermally Stable, Mesoporous Silica Structures, J. Am. Chem. Soc., 1998, 120, 6024-6036.

Wolf, G., et al., Calorimetric Process Monitoring of Thermal Decomposition of B-N-H Compounds, Thermochimica Acta 343, 2000, 19-25.

Zuttel, Andreas, Materials for Hydrogen Storage, Materialstoday, Sep. 2003, 24-33.

Dr. rer. nat., (non-English) Dissertation, Sep. 29, 1972, 1-130.

Wagemans, Rudy W. P., et al., Hydrogen Storage in Magnesium Clusters: Quantum Chemical Study, J. Am. Chem. Soc., 2005, 127, 16675-16680.

International Search Report/Written Opinion from International Application No. PCT/US2010/033612, International Filing Date May 4, 2010.

Autrey, Tom, et al., Chemical Hydrogen Storage in Nanostructured Materials, Control of Hydrogen Release and Reactivity From Ammonia Borane Complexes, Preprints of Symposia—American Chemical Society, Difision of Fuel Chemistry, 49(10), 150-151, Mar. 2004.

Zhao, Dongyuan, et al., Triblock Copolymer Syntheses of Mesoporous Silica with Periodic 50 to 300 Angstrom Pores, Science, vol. 279, Jan. 23, 1998, 548-552.

Jun, Shinhae, et al., Synthesis of New Nanoporous Carbon with Haxagonally Ordered Mesostructure, J. Am. Chem. Soc., vol. 122, Dec. 10, 2000, 10712-10713.

* cited by examiner

BULK-SCAFFOLDED HYDROGEN STORAGE AND RELEASING MATERIALS AND METHODS FOR PREPARING AND USING SAME

CROSS REFERENCE TO RELATED APPLICATION

This application is a Continuation-In-Part of Divisional application Ser. No. 11/941,549 filed 16 Nov. 2007, which in turn is a Divisional of U.S. application Ser. No. 10/778,997 filed 12 Feb. 2004, now granted as U.S. Pat. No. 7,316,788.

GOVERNMENT SUPPORT

This invention was made with Government support under Contract DE-AC0676RLO-1830 awarded by the U.S. Department of Energy. The Government has certain rights in the invention.

FIELD OF THE INVENTION

The present invention relates generally to materials and processes for storing hydrogen, and uses for same. More particularly, the present invention relates to bulk-scaffolded materials, compounds, materials, and combinations that provide storage and release of bulk quantities of hydrogen at lower release temperatures and faster release rates for operation of hydrogen-fueled on-board and off-board devices and applications.

BACKGROUND OF THE INVENTION

The Department of Energy (DOE) issued a challenge for hydrogen storage related technologies during 2003 to compliment existing programs on Hydrogen Production and Fuel Cell development. Part of the challenge involved proposed project milestones in calendar years 2010 and 2015 for the development of new materials and technologies relating to storing hydrogen for use as vehicle energy sources. Four technologies for storing hydrogen are under investigation in the technical art: (1) storage as simple metal hydrides, e.g., $MgH_2$, (2) storage on carbon materials, including single-walled carbon nanotubes, (3) storage as complex metal hydrides, e.g., $NaAlH_4$, and (4) chemical hydrogen storage, e.g. $NH_xBH_x$, where x=1 to 4. The technical developments related to chemical hydrogen storage technology are discussed further hereafter. Baitalow et al. have shown the potential for use of N—B—H compounds including ammonia borane (AB), $NH_3BH_3$, as a hydrogen storage material. Jaska et al. report hydrogen formation in AB is likely to occur by an intermolecular dimerization pathway as shown in reaction [1], although a two-step mechanism shown in reactions [2] and [3] is not ruled out:

$$2NH_3BH_3 \rightarrow NH_3BH_2\text{—}NH_2BH_3+H_2 \quad [1]$$

$$NH_3BH_3 \rightarrow NH_2\!\!=\!\!BH_2+2H_2 \quad [2]$$

$$2NH_2\!\!=\!\!BH_2 \rightarrow NH_3BH_2\text{—}NH_2BH_3 \quad [3]$$

Each step that forms a new B—N bond also forms hydrogen, as illustrated in reactions [4] and [5]:

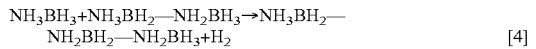

Baitalow et al. further report at temperatures greater than 150° C., additional hydrogen may be released as illustrated in reactions [6] and [7]:

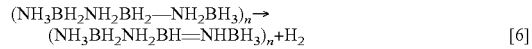

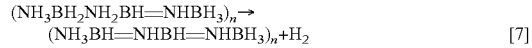

However, it is well known in the art that release of hydrogen from neat AB occurs at temperatures at which undesirable side reactions occur thereby generating products that contaminate and decrease the purity of the released hydrogen for use as fuel. For example, formation of cyclic borazine, c-$(NHBH)_3$, an inorganic analog of benzene, is one such contaminating product reported by Wideman et al., illustrated in reaction [8]:

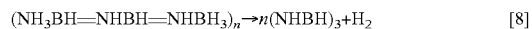

Raissi et al. have reviewed data for hydrogen release from the neat solid AB. The reaction of $NH_3BH_3$ that yields $NH_3(BH_2\text{—}NH_2)_nBH_3$+free $nH_2$ releases hydrogen at temperatures near 115° C. in reactions that are comparatively slow and that again have a high potential for forming borazine. At even moderate reaction temperatures (e.g., >150° C.), borazine yields are significant. Borazine is damaging to fuel cells. Thus, its presence means the purity of released hydrogen remains questionable and thus unsuitable for use.

As the current state of the art shows, use of AB materials remains problematic due to: 1) relatively high reaction temperatures required for hydrogen release, 2) slow rates for release of hydrogen, and 3) presence of contaminants like borazine that contaminate the hydrogen released from the source materials that complicate their use as a fuel source.

Accordingly, there remains a need to: 1) decrease temperatures at which hydrogen is released to meet proposed guidelines for bulk hydrogen fuel storage and use; 2) improve rates for hydrogen release; and 3) minimize side reactions that generate undesirable and contaminating products thereby increasing the purity of hydrogen that is available as a fuel.

SUMMARY OF THE INVENTION

The present invention provides materials, methods and mechanisms for storing and releasing hydrogen in a way that produces greater rate yields at lower temperatures than are found in the prior art while simultaneously preventing undesired side reactions and providing released hydrogen with sufficient purity so as to allow for various hydrogen energy based applications. The materials of the present invention provide greater capacities for storage and release of hydrogen in a pure state and thus have the potential to serve numerous industrial applications wherein high hydrogen storage and usage demands may be met, including, but not limited to, next generation fuel cells and hydrogen sources, applicable to uses in the automobile industry and elsewhere.

In one embodiment the invention is a bulk-scaffolded hydrogen storage and releasing material, made up of a preselected ratio of at least one hydrogen storage and releasing compound combined with a porous support to form a bulk-scaffolded hydrogen storage that releases a bulk quantity of hydrogen at a greater rate, a lower temperature, than the hydrogen storage compound alone. In one embodiment of the invention the hydrogen storage and releasing compound comprises about 30% to about 99% of said material by weight. In another embodiment of the invention the porous support comprises between about 70% to about 1% of said material by weight. This porous support can have pores in a variety of sizes either uniform or random and can also be doped with a metal ion or metal oxide. The hydrogen storage and releasing compound can be any of a variety of suitable materials, however it has been shown that the following materials in particular are beneficial to achieve the desired results and effect: Li, Be, B, C, N, O, F, Na, Mg, Al, Si, P, and combinations thereof. In other applications, the material for storing and releasing hydrogen currently and preferably comprises a member selected from the group of N—B—H compounds, including, but not limited to, ammonia borane (AB) that when deposited onto a support or scaffolding material, the composition exhibits unique and useful properties for storing and releasing hydrogen. Other materials suitable for use as hydrogen storing and releasing compounds or materials include: chemical hydrides, complex hydrides, metal hydrides, polymers, conducting polymers, nitrogen boron compounds, boron nitride, carbon materials, and combinations thereof. Support materials include, but are not limited to, members selected from the group of porous materials, interconnected materials, non-interconnected materials, channeled materials, aerogels, aerogel materials, polymer materials, porous polymer materials, nonporous materials, mesoporous materials, zeolites, zeolite materials, silica, silicon dioxide, mesoporous silica, titanium dioxide, mesoporous titanium dioxide, carbon materials, carbon nanotubes, activated carbon materials, graphite materials, mesoporous carbon materials, and combinations of these materials.

In various embodiments of the invention, the porous materials may be a microporous material, having a pore sizes ranging between 0.4 nm and 2 nm, while in other applications these materials may be a mesoporous material having a pore size ranging between 2 nm to 50 nm while in some other applications the support is a macroporous material having a pore size ranging between 50 nm to 1000 nm. These porosities can vary but is generally preferred to be at least 20% porosity by volume. In addition the types of porous supports can vary however it has been shown that materials such as silica, alumina, and carbon are effective.

The ratio of hydrogen storage and releasing compounds together with the porous support is typically somewhere within the range of from (1:2) to (4:1) by weight, respectively. The bulk scaffolded materials release hydrogen at a temperature at least ten degrees lower than said hydrogen storage and releasing compound alone. This results in materials that can reliably release relatively clean hydrogen at a desired rate of release at temperatures below 95° C., and in some applications even less than about 85° C. In addition to these lower temperatures of release these bulk-scaffolded materials can release stored hydrogen at rates at least twice that of the rate of hydrogen release of the hydrogen storage and releasing compound alone. In some applications this can be as high as one order of magnitude greater than the rate of hydrogen release of the hydrogen storage and releasing compound alone. These advantages can be combined in a variety of structures and materials including hydrogen fuel source, a hydrogen storage material or an accessory to various electrical applications. This provides potential applications for powering a variety of devices ranging from electronic devices, to fuel cells [e.g., solid oxide and proton exchange membrane (PEM) fuel cells], to hydrogen sources that provide power to accessories in the automobile industry, and to hydrogen powered combustion engines. Such compounds can enable a variety of applications in a combined system such as an automobile where hydrogen can be used to power a variety of associated and interactive systems. In other applications, these compounds can provide fuel to power fuel cells that can be expected to provide energy in such devices as laptops and cell phones and may be used to power such accessories as air conditioners, radios, power windows, sun roofs, and global positioning satellite (GPS) devices in automobiles.

The method of preparing the hydrogen storage materials of the instant invention includes the steps: 1) providing a support composed of a high surface area material, and 2) combining the support with at least one compound capable of storing and releasing hydrogen, wherein the compound(s) when deposited on the support releases hydrogen at a greater rate and a lower temperature relative to the neat material. The term "combining" as used herein describes various chemical and physical processes, including, but not limited to impregnating, depositing, layering, coating, physisorbing, chemisorbing, mixing, wetting, polymerizing, chemically bonding, and combinations thereof. The resulting composite material for storing and releasing hydrogen may be adapted for both on-board and off-board applications, including but not limited to, on-board devices, off-board devices, hydrogen generators, fuel sources and components, solid oxide fuel cells and associated components, as well as constituents and/or components in/for engines, including, but not limited to, vehicle engines, combustion engines, automobile engines, and the like.

Materials of the present invention provide greater capacities for storage and release of hydrogen in a pure state, at lower temperatures and/or greater release rates, and thus have the potential to serve numerous industrial applications where high hydrogen usage demands may be met, including, but not limited to, next generation fuel cells [e.g., solid oxide and proton exchange membrane (PEM) fuel cells] and hydrogen sources, applicable to uses in the automobile industry, and elsewhere. For example, fuel cells are expected to provide energy in such devices as laptops and cell phones and may be used to power such accessories as air conditioners, radios, power windows, sun roofs, and global positioning satellite (GPS) devices in automobiles.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions I have shown and described only the preferred embodiment of the invention, by way of illustration of the best mode contemplated for carrying out the invention. As will be realized, the invention is capable of modification in various respects without departing from the invention. Accordingly, the drawings and description of the preferred embodiment set forth hereafter are to be regarded as illustrative in nature, and not as restrictive.

TERMS

Figure 1A:
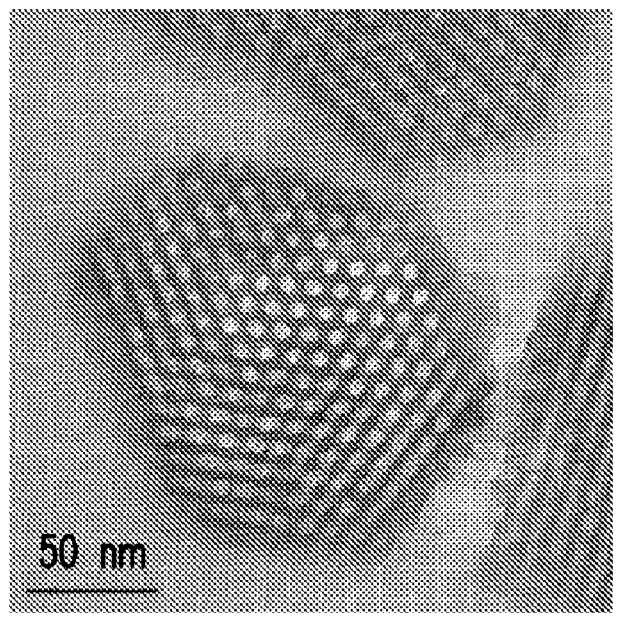
FIG. 1a is a high resolution transmission electron micrograph (HRTEM) that shows a cross-sectional view of a support comprised of a porous silicate template, i.e., SBA-15.

The following terms are used herein.

The term "bulk-scaffolded hydrogen storage and releasing material" as used herein means a preselected quantity of at least one hydrogen storage and releasing compound that is combined, mixed, or otherwise associated with a scaffold, support, or template material. Bulk-scaffolded materials of the invention include between from about 30 wt % to about 99 wt % of a hydrogen storage and releasing material and between from about 70 wt % to about 1 wt % of a scaffold, Support, or template material. Bulk-scaffolded materials of the invention are configured to release or deliver a bulk quantity of hydrogen sufficient for operation of a hydrogen-fueled device or application. Bulk-scaffolded materials of the invention are not catalysts, by definition, because hydrogen released or delivered by these materials is consumed and must be regenerated or recharged, but does not exclude addition of a catalyst to the matrix of the hydrogen storage and releasing component. Thus, no limitations are intended. Results described herein demonstrate that bulk-scaffolded materials of the invention alter or affect at least one of the following properties or parameters: the thermodynamics of reaction, temperatures of reaction, kinetics and rates of reactions, including combinations of these properties.

The term "neat" as used herein means a hydrogen storage and releasing material before it is combined with a scaffold or support. Neat materials can include a single hydrogen storage and releasing material or compound (e.g., 100% or pure); more than one hydrogen storage and releasing material (e.g., in a 50:50 combination); more than two hydrogen storage and releasing materials (e.g., in a 50:20:10 combination or the like), as well as other combinations.

The term "bulk" as used herein in reference to bulk-scaffolded materials of the invention means a preselected and suitable quantity of a hydrogen storage and releasing material that is combined with a scaffold or support. The term when used in reference to the quantity of hydrogen released from a bulk-scaffolded hydrogen storage and releasing material means a quantity of hydrogen other than a catalytic quantity sufficient for operation of a hydrogen-fueled device, e.g., a fuel cell or a combustion engine.

The term "catalytic quantity" means a quantity of a catalyst that is less than 10% by weight. By definition, a catalyst is not consumed in a reaction, does not alter the thermodynamics of a reaction, and can only affect the rate of a reaction.

The term "support" as used herein means a high surface area compound or material that is combined with a hydrogen storage material to form a bulk scaffolded hydrogen storage and releasing material.

The term "template" in reference to the materials of the present invention refers to molecules, macromolecules, compounds, and/or material combinations that serve as patterns for the generation or synthesis of other macromolecule(s), compounds, and/or features being deposited, coated, laid down, and/or polymerized.

The term "pore" as used herein means a cavity, depression, or channel present of a scaffold, support, or template material that permits entry of, or that retains, a hydrogen storage and releasing material. The term "pore" encompasses various shapes including, but not limited to, e.g., round and square. A scaffold, support, or template material that includes these pores is said to be "porous". Pores in these scaffolds, supports, and template materials are also of preselected sizes. Porous materials include, but are not limited to, interconnected porous materials, non-interconnected porous materials, ordered porous materials, non-ordered porous materials, and porous materials that include, e.g., pores, channels, features, and combinations of these elements. Supports of the present invention are preferably made of porous materials that are mesoporous, but are not limited thereto. For example, porous materials may also include microporous and macroporous materials. Porous materials can further include a plurality of pores, features, and/or channels. Materials that include pores, channels, and features as will be selected by those of skill in the art in view of the disclosure are within the scope of the invention, including manufacturing and/or application methods. In particular, those skilled in the art will appreciate that hydrogen storage and releasing materials described herein, as well as related moieties, including, e.g., chemical products and/or intermediates can be applied to various templates, supports, and substrates of a porous or nonporous type to preparation bulk scaffolded hydrogen storage and releasing materials of the invention. Thus, no limitations are intended.

The term "microporous" as used herein means pores with a size in the range from about 0.4 nm to 2 nm.

The term "mesoporous" as used herein means pores with a size in the range from about 2 nm to 50 nm.

The term "macroporous" as used herein means pores with a size in the range from about 50 nm to 10,000 nm.

The term "high surface area" in reference to scaffold, support, or template materials means a surface area of at least about 50 $m^2/g$.

The term "combining" as used herein describes various chemical and physical processes, including, but not limited to impregnating, depositing, layering, coating, physisorbing, chemisorbing, mixing, wetting, polymerizing, chemically bonding, and combinations thereof.

DETAILED DESCRIPTION OF THE INVENTION

Bulk-scaffolded hydrogen storage and releasing materials are described herein that provide bulk quantities of hydrogen for hydrogen-fueled devices and like applications. While the present invention is described herein with reference to the preferred embodiments thereof, it should be understood that the invention is not limited thereto, and various alternatives in form and detail may be made therein without departing from the scope of the invention.

Figure 1B:
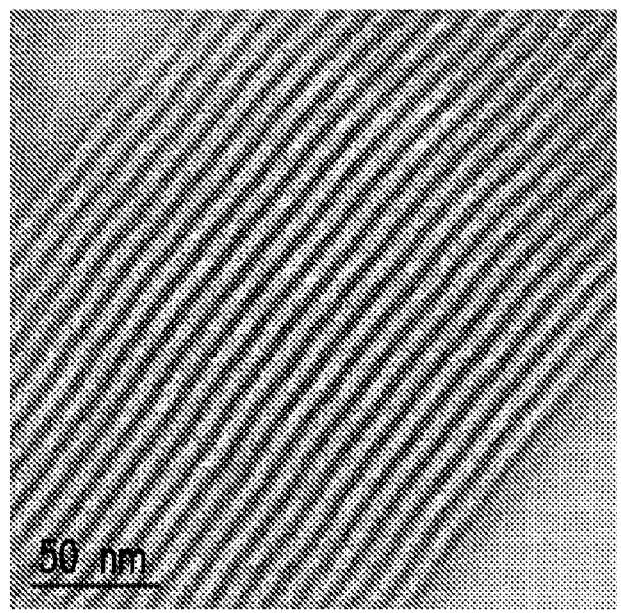
FIG. 1b is an HRTEM that shows a transverse view of a porous silicate template, i.e., SBA-15.

FIG. 1a and FIG. 1b show high resolution transmission electron microscope (HRTEM) images of a support 100 material used in conjunction with the invention in cross-section and transverse views, respectively. Support 100 is a template material comprised of, e.g., mesoporous silica nanoparticles, e.g., Santa Barbara Amorphous type [SBA-15 (SBA)]. Support materials serve as templating substrates whereby bulk hydrogen storage and releasing materials are deposited, impregnated, deposited, chemi-sorbed, physi-sorbed, coated, polymerized, and/or chemically bound at correct weight ratios. The nature of the surfaces (both interior and exterior) of the substrate or support allow contouring, mimicking, and/or mirroring the detail or pore structure of the substrate surface on which the bulk hydrogen storage material is deposited or in chemical communication with. Support 100 can include both porous and non-porous materials of a high surface area, i.e., of at least about 50 $m^2/g$. Porous silica templates have an extremely high surface area and a highly ordered pore structure. Silica ($SiO_2$) is a preferred support material for the template reactions of the present invention by virtue of the pore structure, but is not intended to be limited thereto. Support 100 comprises a plurality of pores or channels. Pores of a support material are preferably of a size in the range from about 0.4 nm to 10,000 nm. Pores of microporous support materials are preferably selected in the range from about 0.4 nm to about 2 nm. Pores of mesoporous support materials are preferably selected in the range from about 2 nm to about 50 nm. Pores of macroporous support materials size are preferably selected in the range from about 50 nm to 10,000 nm. Suitable materials for support 100 can further include porous carbon (e.g., mesoporous carbon), porous $TiO_2$ (e.g., mesoporous titanium dioxide), porous $Al_2O_3$ (e.g., mesoporous alumina) and like supports, including supports made of support materials doped or coated with metal ions or metal oxides. Support materials can further include porous silica and porous carbon doped or coated with, e.g., aluminum ($Al^{+3}$) and/or titanium ($Ti^{+4}$), or those doped or coated with, e.g., $Al_2O_3$ and/or $TiO_2$. Support 100 may be further formulated in a variety of shapes or particle configurations specific to the intended application. For example, support materials may be comprised of, or take the form of, nanoparticles, nanospheres, colloidal particles, and combinations of these material types. Particles of the present invention, including, but not limited to, nanoparticles and colloidal particles, are preferably of a size in the range from about 1 nm to about 10 μm. Support 100 is combined with at least one compound having a high weight or volume ratio density of hydrogen, although more than one compound can be envisioned. Materials for storing and releasing hydrogen preferably include at least one element selected from the group consisting of Li, Be, B, C, N, O, Na, Mg, Al, Si, P, S, or combinations thereof. Exemplary materials with these elements include, but are not limited to, e.g., $LiBH_4$, $NaBH_4$, $Mg(BH_4)_2$, $AlH_3$, $LiAlH_4$, $Li_3N$ (i.e., $LiNH_2+LiH$), $MgH_2$, $LiH$, $B(OH)_3$, $RSiH_3$, $RSiH_2R$, including combinations of these compounds. Other elements and exemplary compounds include, but are not limited to, e.g., Ca [e.g., $Ca(BH_4)_2$, $Ca(NH_2BH_3)_2)$]; Ti [e.g., $Ti(NH_2BH_3)_4$]; and Al[Al($NH_2BH_3)_4$]. No limitations are intended by the disclosure of exemplary compounds.

More preferably, materials for storing and releasing hydrogen are selected from the group of $NH_xBH_x$ compounds where x is in the range from about 1 to 4, ammonia borane ($NH_3BH_3$) being representative, but not exclusive. For example, metal hydrides, complex hydrides, other chemical hydrogen storage materials (e.g., ammonia, $NH_3$), and/or mixtures thereof can be envisioned. Combining support 100 and compound(s) having a high weight percentage of hydrogen (i.e., >30 wt %) produces a material exhibiting uncharacteristic properties that include a faster release rate and a lower release temperature for hydrogen relative to neat materials (i.e., material not combined with the support) themselves. Ammonia borane (AB) as a hydrogen storing and releasing material is preferably deposited or fashioned at thicknesses whereby the AB hydrogen storage and releasing material is combined at a 1:1 weight ratio with the support 100 or scaffolding substrate thereby yielding a 1:1 composite material, e.g., 1:1 AB:SBA-15, but is not limited thereto. For example, other weight ratios between the AB hydrogen storing and releasing material and the SBA support 100 are easily accommodated. For example, AB:SBA weight ratios of 1:2, 1:3, and greater, or alternatively AB:SBA weight ratios of 1:1, 2:1, 3:1 and greater may be deployed to maximize hydrogen storage and release. Choices as will be selected by those of ordinary skill in the art are within the scope of the invention.

Porous materials used as the support or template material preferably comprise at least about 20% porosity by volume. The high surface area support material is preferably selected from the group consisting of porous nanoparticles, porous coated nanoparticles, and combinations thereof. Porous coated nanoparticles may be selected from the group consisting of externally coated, internally coated, both externally/internally coated, internally Filled, internally filled/externally coated, and combinations thereof.

Non-porous materials may be used as supports or scaffold materials if they have a sufficiently high surface area. Non-porous materials are preferably selected from the group of non-porous nanoparticles, externally coated non-porous nanoparticles, and combinations thereof. Examples of a non-porous support include, but are not limited to, a composite comprising nanoscale features or channels, e.g., non-porous nanoparticles and/or non-porous spheres. It should be noted that to further enhance the kinetics or thermodynamics for hydrogen release and uptake, catalysts and catalyst like materials may be added to the support(s), hydrogen storage material(s), or the bulk-scaffolded hydrogen storage and releasing materials of the invention. For example, adding a transition metal catalyst and/or a carbon material to the bulk-scaffolded hydrogen storage and releasing material can be used to enhance kinetics or thermodynamics for release of hydrogen from these materials. Catalysts as would be envisioned or deployed by a person of ordinary skill in the art are within the scope of the invention.

Solvents for preparing materials of the present invention include hydrocarbon and organic solvents such as methanol, ethanol, diethyl-ether, tetrahydrofuran, and supercritical fluids of water, ammonia, and carbon dioxide. Preferred solvents provide rapid drying of dissolved hydrogen storage and releasing materials once combined with, or deposited on, the support whereby the hydrogen storage and releasing materials quickly and efficiently bond to the support. No limitations in the selection of applicable solvents is hereby intended by the disclosure of the preferred solvent.

The following examples are intended to promote a further understanding of the present invention.

Example 1

Hydrogen Release Temperature

1:1 Composite

AB:SBA-15

Hydrogen release temperatures for a 1:1 (weight ratio) AB:SBA-15 composite were compared to release temperatures for the neat AB material.

Experimental. A support 100, SBA-15, comprising mesoporous silica with a plurality of hexagonally ordered nanoscale pore channels was prepared as described by Zhao et al. [*Science*, 279, 548 (1998); and *J. Am. Chem. Soc.*, 1998, 120, 6024-6036], which references are incorporated herein in their entirety by reference. In a typical preparation of SBA-15, 12.0 g of non-ionic surfactant comprising ethylene oxide/propylene oxide block copolymer (MW=approx. 5,800) sold commercially under the tradename PLURONIC® P-123 non-ionic surfactant (BASF Corp., Mount Olive, N.J., USA) was dissolved in 360 mL of 2M HCl solution at 40° C. 25.5 g of 98% tetra-ethyl-ortho-silicate (TEOS), available commercially (Sigma-Aldrich Corp., St. Louis, Mo., USA) was added to the milky solution and stirred for 18 hours at the same temperature. The mixture was transferred into a teflon-lined autoclave and heated to 100° C. for 24 hours without stirring. The white precipitate was filtered, dried in air, and calcined at 550° C. for 6 hours. Thin sections of the resultant support specimen were subjected to high resolution transmission electron microscopy (HRTEM) observation, prepared by standard epoxy embedding followed by ultra-microtoming, e.g., slicing, to a thickness of 50 nm or less. Support 100 was found to have an average particle size of from 100-200 μm, an average surface area of approximately 1000 m$^2$/g, and a pore and/or channel diameter starting at about 3 nm. The hydrogen storing and releasing material, ammonia borane (AB), was prepared for use in combination with support 100 as follows. 90% technical grade AB (Sigma-Aldrich Corp., St. Louis, Mo., USA) was purified by recrystallization from diethyl ether, followed by washing with ethanol to remove polymeric and borate impurities, thereby yielding >99% pure $NH_3BH_3$, as shown by $^{11}B$ Nuclear Magnetic Resonance (NMR) imaging. Deposition and/or coating of the purified AB to the support 100 was done as follows. 50 mg of purified AB was dissolved in 0.3 mL methanol after which a 50 mg sample of the SBA-15 support material 100 was wetted with the methanol solution. Given the porous nature of the support 100, capillary action rapidly filled the internal channels and pores of the mesoporous template material. The 'wet' SBA-15 was dried under vacuum to remove the methanol solvent, yielding a AB:SBA composite material having a 1:1 weight ratio of AB to SBA-15 in the composite. Clumping of the solid AB on the template can be expected if the internal channels are not successfully coated. However, SEM images (not shown) of the SBA-15 material before and after coating with AB showed very similar features, and an absence of clumping. HRTEM analyses were carried out on a Jeol JEM Model 2010 microscope (JEOL USA, Inc., Peabody, Mass., USA) having a specified point-to-point resolution of 0.194 nm. The operating voltage on the microscope was 200 keV. Images were digitally recorded (image size 1024×1024 pixels) with a Gatan slow scan model 692-0100 camera system (Gatan Inc., Pleasanton, Calif., USA). Image processing was carried out using Digital Micrograph™ version 3.1 software (Gatan Inc., Pleasanton, Calif., USA). Differential Scanning Calorimetry (DSC) analyses of the neat AB material and the chemically combined AB:SBA-15 material were performed using a Netzsch STA 409 combination Thermal Gravimetric Analyzer (TGA) and Differential Scanning Calorimeter (DSC) (NETZSCH Instruments, Inc. 37 North Ave. Burlington, Mass. 01803) or alternatively a Setaram C80 Calorimeter (Setaram, Caluire, FR) in combination with a Pfeiffer QMS300 Mass Spectrometer (Pfeiffer Vacuum Ltd., UK) equipped with a standard electron impact ionization detector. In the Netzsch equipment, a heated fused silica capillary (200° C.) was used to transfer the off gas from the TGA to the mass spectrometer (MS). A thermal temperature ramp of 1° C./min over a temperature range from room temperature to about 250° C. at an argon flow of 40-100 cc/min was used. The MS scanning rate was 12 seconds for a range of 1 to 100 amu.

Figure 2:
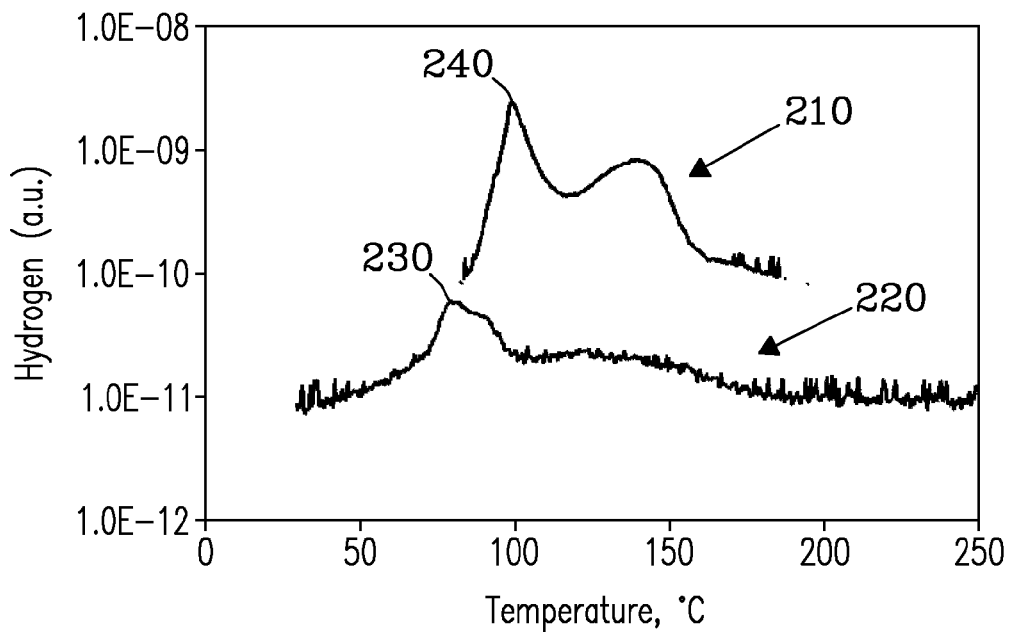
FIG. 2 shows the unique temperature profile for release of hydrogen from a 1:1 AB:SBA-15 composite compared to neat AB.

Results. FIG. 2 compares the hydrogen release curves determined by mass spectrometric analysis for the neat AB 210 and AB:SBA-15 composite 220 as a function of DSC thermal decomposition temperature. DSC results show hydrogen was released for the 1:1 AB:SBA-15 material in the temperature range from about 25° C. to about 200° C. with a peak exotherm 230 for hydrogen release occurring at 79.4° C., well below the 100° C. objective. The neat AB 210 in comparison released hydrogen in the temperature range from 74° C. to 200° C. with the peak release exotherm 240 occurring at about 97.6° C. As shown in FIG. 2, release temperature in the composite 220 is reduced by a factor of about 23 percent compared to the neat material 210. If reaction (1) is the correct mechanistic pathway, then it follows that the dimerization reaction forms oligomers through subsequent bimolecular de-hydro-polymerization pathways. The result observed for the composite is especially attractive given that a fundamental requirement for on-board vehicle storage is the release of hydrogen at temperatures significantly below 100° C., an objective met by the AB:SBA-15 composite in Example 1.

Example 2

Hydrogen Release Temperature

2:1 and 3:1 Composites

AB:SBA-15

AB:SBA-15 composites at weight ratios greater than 1:1 were used to compare hydrogen release temperatures and yields to the neat AB material.

Experimental. Composite materials were prepared as in Example 1 at weight ratios for AB to SBA-15 of 2:1 and 3:1 and compared to results for both the 1:1 composite and the neat AB material.

Figure 3:
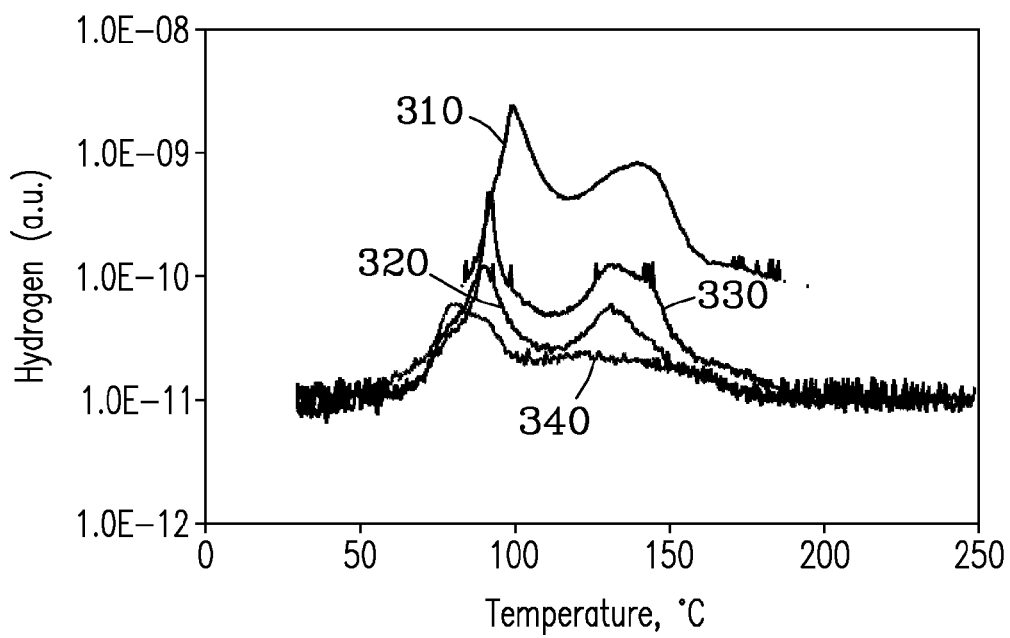
FIG. 3 presents mass-spectral data for hydrogen release as a function of DSC thermal decomposition temperature for a 1:1 AB:SBA-15 composite, a 2:1 AB:SBA-15 composite, and a 3:1 AB:SBA-15 composite.

Results. FIG. 3 presents results comparing mass-spectral (MS) data for hydrogen release as a function of DSC thermal decomposition temperature for a 2:1 AB:SBA-15 composite 320 material and a 3:1 AB:SBA-15 composite 330 material relative to the 1:1 AB:SBA-15 composite 310 and neat AB 320. In the figure, maximum exotherm temperatures for hydrogen release in the 2:1 composite 320 and the 3:1 composite 330 were 89.9° C. and 92.7° C., respectively. These compare with a release temperature for the 1:1 composite 310 of 79.4° C. and for the neat AB 320 of 97.6° C., respectively. Results show that while the hydrogen release temperatures for the greater weight ratio composites to be above those for the 1:1 composite 310, release temperatures for the 2:1 composite and 3:1 composite are still operable below the 100° C.

benchmark, exhibiting temperature reductions for release of hydrogen of about 8% and about 5%, respectively, compared to the neat AB 320.

Example 3

Borazine Formation

In order to achieve peak fuel performance, the cyclization reaction that forms borazine (FW=80.47), illustrated in reaction (8), must be minimized and the desired dehydrogenation reactions shown in reactions (6) and (7) optimized. Samples of the 1:1 AB:SBA-15 test material were used to test the hypothesis that the yield of borazine would be reduced in the 1:1 AB:SBA-15 test material when heated, compared to the neat AB material. If, as expected, the AB was coated on the inside of the mesoporous silica (e.g., SBA-15) template 100, expectation was that the template 100 would minimize borazine formation by controlling linear polymer growth and minimizing the undesired cyclization reaction.

Experimental. Differential scanning calorimetry (DSC) experiments were conducted with concurrent collection of mass-spectral (MS) data to compare samples of neat AB material to test samples of 1:1 AB:SBA-15 material prepared as in Example 1. DSC scan temperature was from 20-200° C. at a scan rate of 5° C./min under an argon purge of 40 cc/min. Mass data were collected at mass numbers 2, 79, 80, and 81, corresponding to hydrogen (MS=2), to borazine (MS=80), and two daughters of borazine (MS=79 and 81), respectively.

Figure 4:
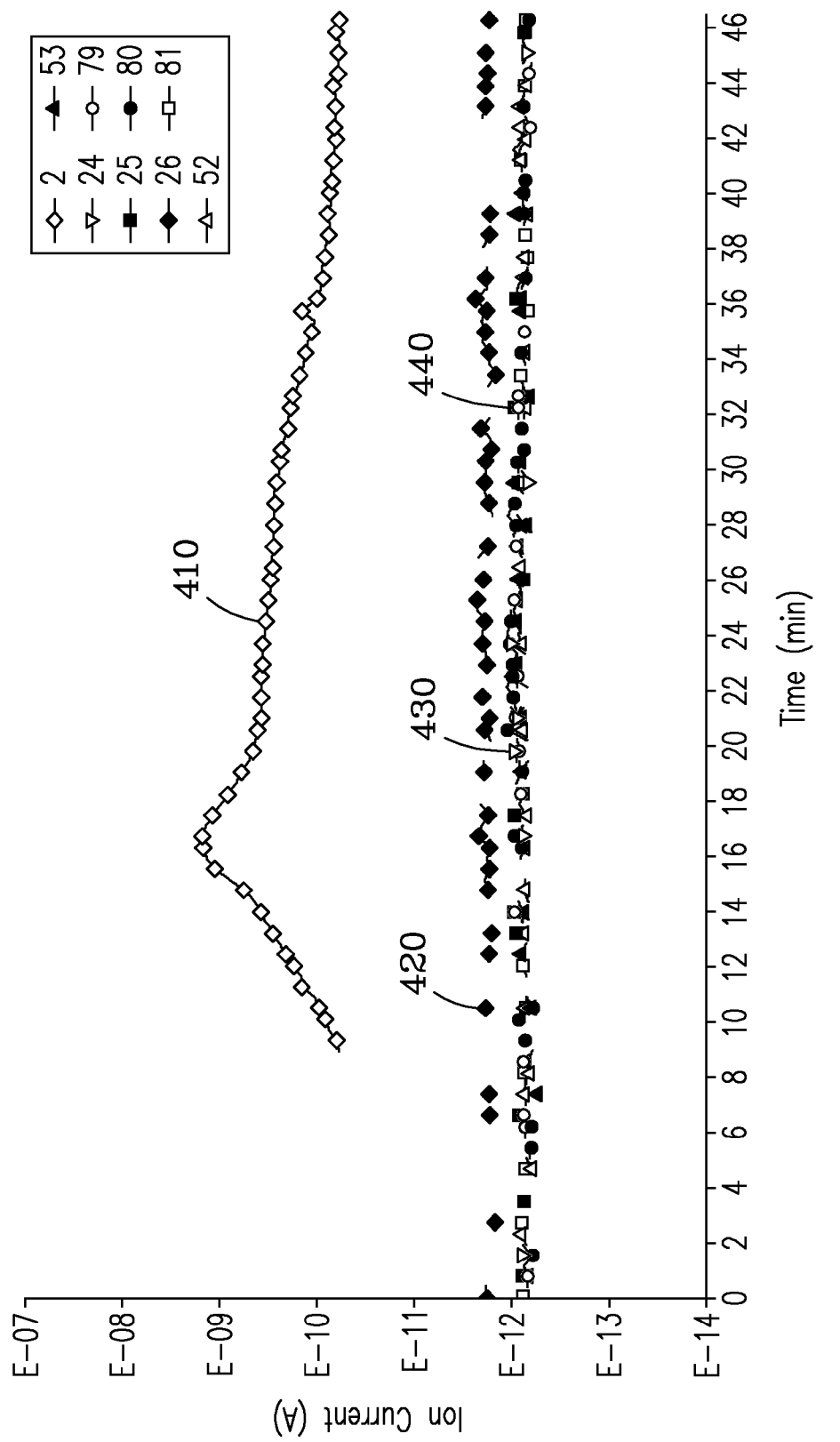
FIG. 4 presents mass-spectral data for release of hydrogen gas from a 1:1 AB:SBA-15 composite as a function of DSC thermal decomposition temperature that shows a low release temperature for hydrogen with an absence of contaminating reaction products.

Results. FIG. 4 presents results comparing mass-spectral (MS) data as a function of DSC thermal decomposition temperature for the 1:1 AB:SBA-15 material and neat (uncombined) AB. In the figure, MS data curves are shown corresponding to mass numbers 2, 79, 80, 81 for hydrogen 410, borazine 420, and two borazine daughter products, curves 430 (m−1 daughter) and 440 (m+1 daughter), respectively. Thermolysis of the AB material in the SBA-15 template (e.g., as 1:1 AB:SBA-15) shows two profound effects different than observed in the neat thermal reaction. First, hydrogen is released from the AB in the support or template material at lower temperatures, e.g., below 100° C. Secondly, borazine is not detected or observed in the AB thermolysis from the mesoporous template SBA-15, in direct contrast with observations for the neat AB material that show borazine is formed during thermolysis of the neat AB. Even at the reduced argon flow rates of 40 cc/minute, no borazine was detected, or was substantially below the detection limit of the mass detector. Further, hydrogen continues to be released from the composite effectively without the interference or presence of contaminating reaction products up to about 170° C., a temperature that routinely corresponds with borazine formation during heating of the neat AB. Results demonstrate that use of the AB:SBA-15 composite, including test cases with mesoporous silica templates 100 (e.g., SBA-15), can be used to control the reactivity of the dehydropolymerization chemistry of ammonia-borane (AB) to yield gaseous hydrogen. Further, that the reactivity of the gaseous reactants in the present composite can be controlled has far-reaching implications. For example, it has been demonstrated that undesirable and/or contaminating gases can be contained or confined within the porous structure and that the desired gases can be released favorably and in a pure state. This means there is selective control of gaseous diffusion and release using the mesoporous substrates whereby various reactant gases can be successfully exploited to enhance control and reaction and release of desired gases or other end products relative to the undesirable ones. One may be able to show similar control of reactant gases, e.g., $NH_3$, reacted and/or released from other comparable composites or storage materials.

Example 4

Rates for Hydrogen Release

1:1 Composite

AB:SBA-15

Rates for hydrogen release as a function of thermal decomposition temperature for the 1:1 AB:SBA-15 test material (prepared as detailed in Example 1) were compared to release rates for neat AB.

Experimental. DSC experiments were conducted on test samples of the 1:1 AB:SBA-15 composite material and neat AB material at several different isothermal temperatures, in the range from about 40° C. to about 60° C. The peak of the DSC curve corresponding to the peak of the hydrogen release from the first reaction step, e.g., AB->polymer+$H_2$ for the neat AB material and the support material can be compared at other temperatures from the slope of the lines taken from plots of log $1/\tau_{1/2}$ (where $\tau_{1/2}$ is the half-life for hydrogen release in units of time) vs. $1/T$ (where T is the temperature) for the AB:SBA-15 compared to neat AB.

Figure 5:
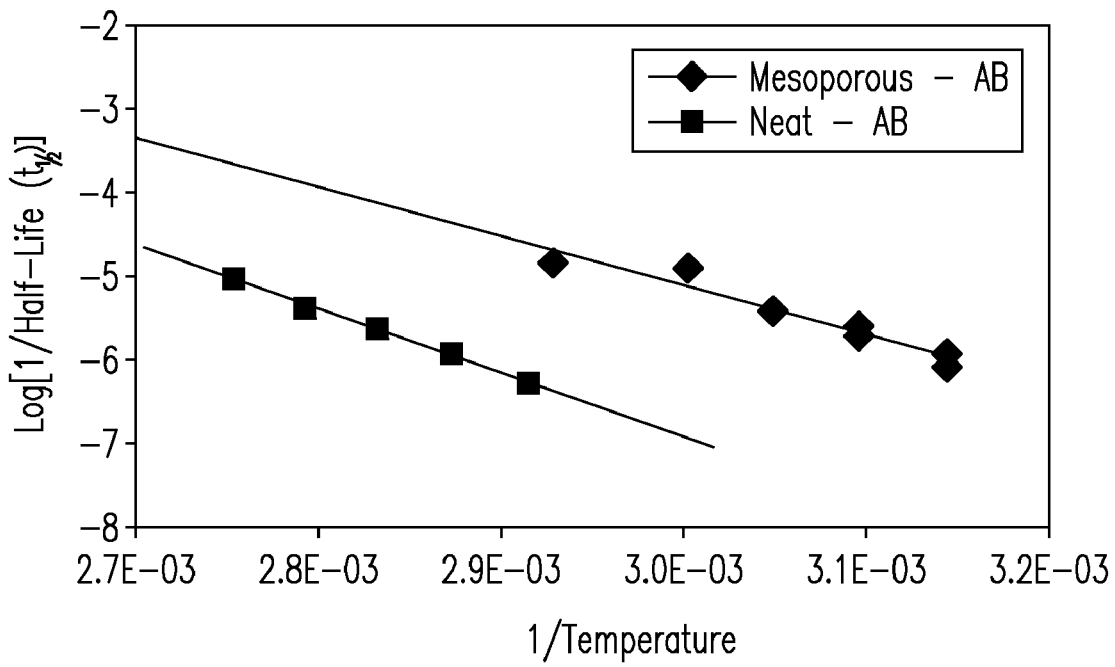
FIG. 5 compares hydrogen release data from a 1:1 AB:SBA-15 composite material and neat AB.

Results. FIG. 5 compares rate data for the thermal decomposition of AB in the 1:1 AB:SBA-15 composite 510 and for neat AB 520, as a function of hydrogen release temperature. Rate difference for hydrogen release between curves 510 and 520, as measured by the vertical displacement, is approximately two log units, indicating the rate of hydrogen release from the 1:1 AB:SBA-15 composite 510 material compared to the neat AB 520 is up to 2 orders of magnitude greater than from the neat AB, or about 100 times faster. Even at 1 order of magnitude, a rate 10 times faster than the neat AB material would be expected. Further, the temperature differences noted for the 2:1 and 3:1 weight ratio composites mean these composites exhibit release rates greater than the neat material as well. Other configurations and/or ratios for the composite material(s) may be equally useful, e.g., 1:2 SBA, for example. The person of ordinary skill will recognize that similar results may be expected using other composite support materials and/or material combinations, for example, composites comprising metal hydrides, or complex metal hydrides, as well as AB combined with other substrates. Thus, no limitations are intended by the disclosure of rate data for the 1:1 AB:SBA-15 composite.

Example 5

Hydrogen Release Temperature

1:1 Composite

AB:Silica Nanoparticles

A 1:1 weight ratio composite of AB and silica ($SiO_2$) nano-spheres/nanoparticles, e.g., AB:$SiO_2$, was prepared as detailed in Example 1.

Experimental. DSC experiments were conducted and hydrogen release temperatures were measured by mass spectrometric analysis for the AB:$SiO_2$ composite. Results were then compared to data collected for 1:1 AB:SBA-15 and for neat AB.

Results. Hydrogen release exotherms for the 1:1 AB:$SiO_2$ composite were comparable to those observed for 1:1

AB:SBA-15, with a slightly higher temperature for release of hydrogen relative to the AB:SBA-15 material. In general, results for bulk scaffolded hydrogen storing and releasing materials in concert with supports or scaffolds (e.g., SBA-15 and $SiO_2$ nanospheres, for example) demonstrate a reduction in temperature, and/or a greater release rate for hydrogen as compared to neat materials not in contact with a support. The reduction in temperatures for hydrogen release may be linked to differences in curvature radii of supports or scaffolds when hydrogen storing and releasing materials are deposited (e.g., SBA-15 and $SiO_2$ nanospheres, for example) on these porous templates and supports. Various material combinations/composites with AB, e.g., clearly show unexpected and notable differences in hydrogen release relative to neat AB alone and for other hydrogen storing and releasing compounds described herein.

Example 6

Hydrogen Release Temperature

2:1 Composite

AB:MCM-41

A 2:1 (e.g., 1.77:1) weight ratio composite of AB and another mesoporous silica material, e.g., Mobil Crystalline Materials (MCM), sold commercially under the tradename MCM-4™ (Mobile Oil Corp., Fairfax, Va., USA), was prepared for use as detailed in Example 1. MCM-41 comprises arrays of non-intersecting hexagonal pore channels. Walls of the channels are amorphous $SiO_2$. Width of the channels can be controlled within about 2 to 10 nm. The exceptional porosity up to about 80% makes MCM-41 a useful support material as with other porous materials, including silicas, silica gels, aerogels, and/or zeolites.

Experimental. DSC experiments were conducted and hydrogen release temperatures were measured by mass spectrometric analysis for the 1.77:1 weight ratio AB:MCM-41 composite. Results were then compared to the neat AB.

Figure 6:
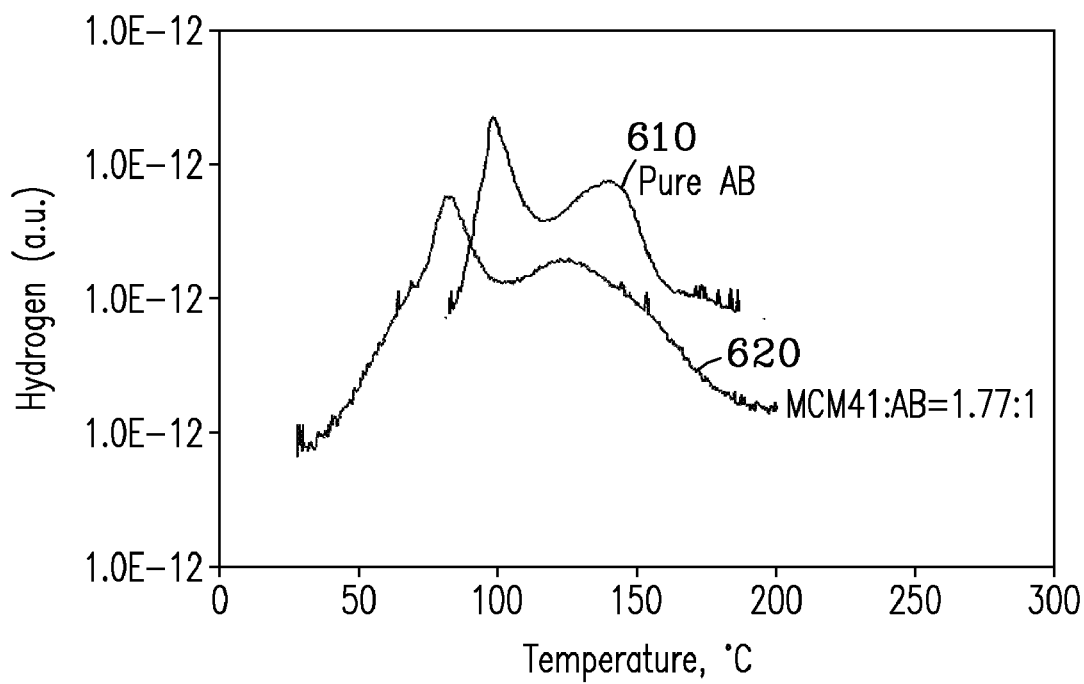
FIG. 6 presents mass-spectral data for hydrogen release as a function of DSC thermal decomposition temperature for a 1.77:1 AB:MCM-41 composite.

Results. FIG. 6 shows the hydrogen release exotherm for the 1.77:1 AB:MCM-41 composite 610 relative to the neat AB 620. As shown in FIG. 6, temperature for hydrogen release is again substantially reduced in the AB:MCM-41 composite 610, being about 81.9° C. as compared to the release temperature from the neat AB 620 at 97.6° C., a reduction in temperature by a factor of about 16% in the AB:MCM-41 composite 610 relative to the neat material 620. This result compares favorably with the release temperature observed for the AB:SBA-15 composites, and is most closely allied with the results obtained for the 2:1 AB:SBA-15 composite 330 in FIG. 3. Again, the reduction in temperatures for hydrogen release in the hydrogen storing and releasing materials deposited on supports or scaffolds (e.g., SBA-15, $SiO_2$ nanospheres, and MCM-41) show unexpected and notable differences in hydrogen release profiles relative to the neat AB alone. Properties of the materials of the present invention evidence their suitability for uses including, but not limited to, hydrogen storage, hydrogen release, fuel sourcing and generation, and providing hydrogen fuel. For example, materials of the present invention demonstrate a high storage capacity for hydrogen in the range up to and including about 24% by weight. Greater yields may be likely with various material combinations. In addition, results show hydrogen can be supplied at significantly faster release rates, lower release temperatures, and lower operating temperatures by simple heating of the dried solid state materials. Further, materials of the present invention exhibit controlled reactivity whereby the quantity of contaminating reaction products is minimized. Other advantages include low foaming observed during the degassing process, which factors into the size, configuration, and/or volume of the containment vessels which ultimately will house the eventual fuels for both onboard and offboard applications. Further, the materials exhibit excellent air and water stability. And, to date, all the reactions involved show a good rationale for reversibility, especially if combined using direct dehydrocoupling. Results suggest the present invention materials can be used or tailored for use as next generation fuel sources applicable to combustion engines including automobile engines and hydrogen-fueled devices, e.g., fuel cells.

Example 7

Hydrogen Release Temperatures

1:2, 1:1, 2:1, 3:1, and 4:1 Composites

AB:MCM-41

Bulk-scaffolded material composites of AB on MCM-41 were prepared by loading AB at various weight ratios onto MCM-41 scaffolds using an incipient wetness approach in tetrahydrofuran or another suitable solvent. Quantity of AB ranged from 30% to 80% by weight with loadings corresponding to weight ratios of 1:2 (33 wt % AB), 1:1 (50 wt % AB), 2:1 (67 wt % AB), 3:1 (75 wt % AB) and 4:1 (80 wt % AB) of AB:MCM-41. $^{11}$B NMR results were compared to neat AB.

Figure 7:
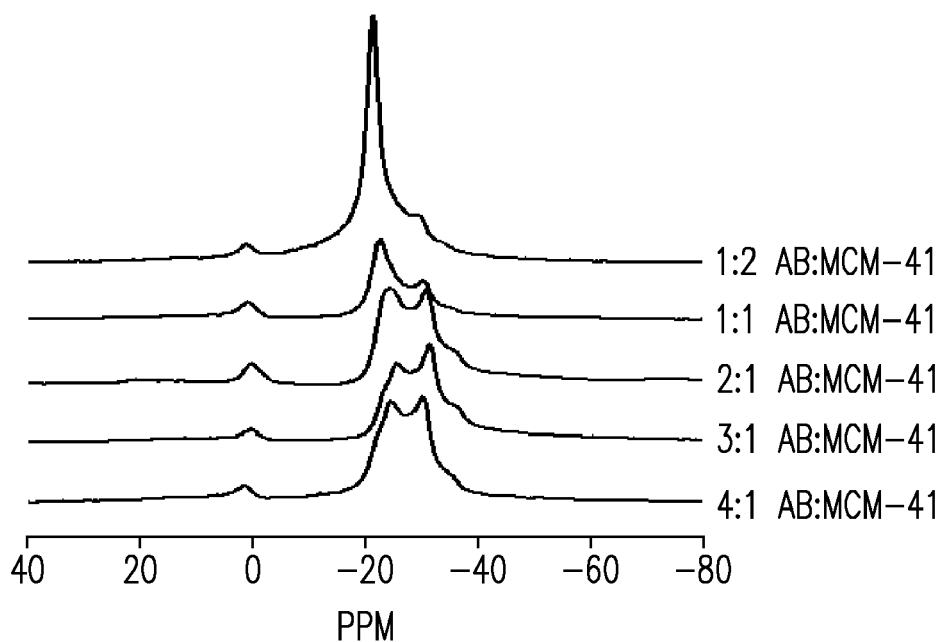
FIG. 7 presents $^{11}B$ NMR spectra of various AB:MCM-41 composites showing the change in the boron environment as a function of loading.

FIG. 7 compares $^{11}$B NMR scans of bulk-scaffolded (e.g., AB on MCM-41) materials at different loadings. At a loading of 33 wt % AB (1:2 weight ratio), the AB signal appears as a single peak in the NMR scan. As the loading increases from 50 wt % AB (1:1 weight ratio) through 80 wt % AB (4:1 weight ratio), a second peak appears and the spectra more closely resemble the spectrum for neat AB.

Figure 8:
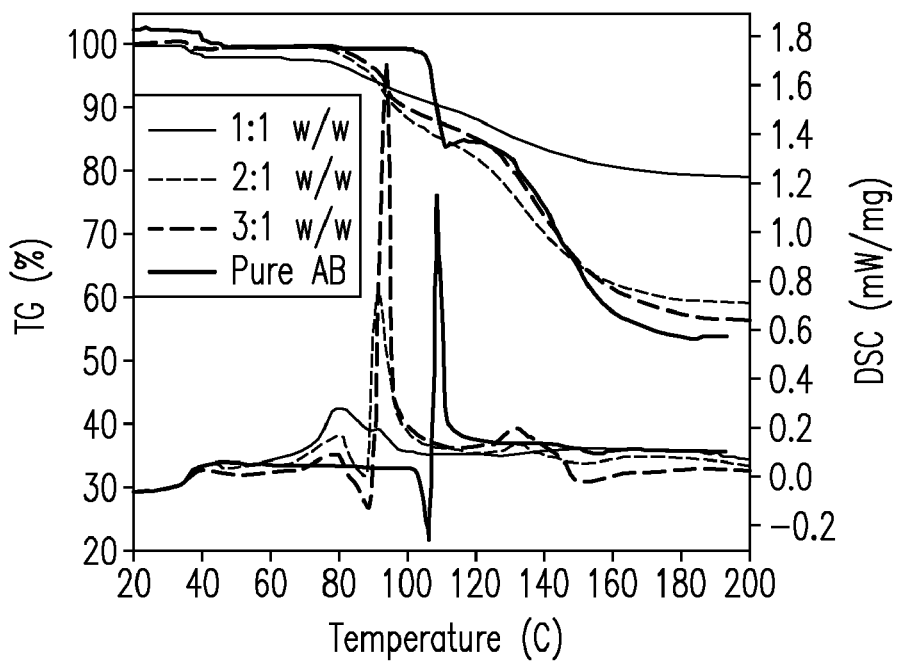
FIG. 8 compares DSC-TG data for AB:MCM-41 composites at weight ratios of from (1:1) to (3:1) to neat AB.

FIG. 8 compares DSC-TG data for AB:MCM-41 bulk-scaffolded composites at weight ratios of from (1:1) to (3:1) with neat AB. Experiments were run at a temperature ramping rate of 1° C./min to a temperature of 200° C. In the figure, as the AB loading in the bulk scaffolded composites increases, onset temperatures for hydrogen release increase becoming more and more like the neat AB. In the 1:1 composite, for example, temperature for release is reduced by about 30° C. In the 2:1 composite, temperature for release is reduced by about 15° C. And, in the 3:1 composite, temperature for release is reduced by about 13° C. In all these cases, temperature for release is below that of the neat material. As long as a support is present, temperatures for hydrogen release are reduced compared to the neat material.

Figure 9:
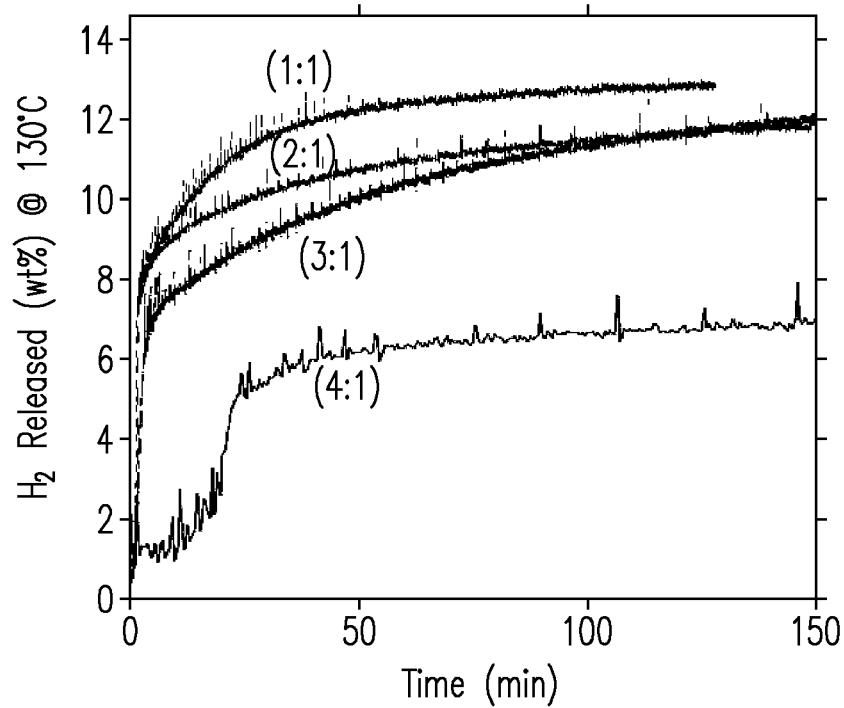
FIG. 9 compares hydrogen release at 130° C. for AB:MCM-41 composites at weight ratios of from (1:1) to (4:1).

FIG. 9 compares quantity of hydrogen released for each of these composites at 130° C. In the figure, rate of hydrogen release and quantity of hydrogen released from the bulk-scaffolded materials differs significantly at the higher loadings. At a loading of 80 wt % AB, the 4:1 ratio of AB:MCM-41 in a bulk-scaffolded material has a hydrogen release that resembles the neat AB; little to no enhancement is observed in the hydrogen release rate. In contrast, at a loading of 33 wt % AB, the 1:1 AB:MCM-41 bulk-scaffolded material shows a rapid release of hydrogen, a significant quantity of released hydrogen. The 2:1 and 3:1 bulk-scaffolded materials released less hydrogen as a function of time and exhibited different rates of release compared to the 1:1 bulk-scaffolded material.

TABLE 1 compares onset temperatures for bulk-scaffolded materials (e.g., AB on mesoporous silica supports) at various ratios against neat AB.

TABLE 1

ΔH values for bulk-scaffolded materials at different heating rates compared to neat AB.

| Sample | Iso[ΔΔ] | Heating Rate 0.1 (° C./min) | 0.5 (° C./min) | 1.0 (° C./min) | Onset temp (° C.) |
|---|---|---|---|---|---|
| neat (AB) | 22 kJ (80° C.) | 22 kJ | 22 kJ | 22 kJ | 110 |
| AB:MCM-41 (1:1)* | 1.5 (50° C.) | 7 kJ | 10.4 kJ | 20 kJ | 60 |
| AB:MCM-41 (1:1)** | — | 9 kJ | 10 kJ | 10 kJ | 120 |
| AB:MCM-41 (2:1)* | — | — | — | 9.5 kJ | 90 |
| AB:MCM-41 (3:1)* | — | — | — | 12 kJ | 90 |
| AB:MCM-41 (1:1)* [+Al (1%)][Δ] | — | — | — | 60 kJ | 60 |
| AB:MCM-41 (1:1)** [+Al (1%)][Δ] | — | — | — | 54 kJ | 120 |
| AB:MCM-41 (1:1)* [+Al (5%)][Δ] | — | — | — | 14 kJ | 60 |
| AB:MCM-41 (1:1)** [+Al (5%)][Δ] | — | — | — | 60 kJ | 120 |

*1st equivalent of hydrogen
**2nd equivalent of hydrogen
[Δ]Percentages correspond to quantity (by weight) of aluminum (Al) added to the support of the bulk-scaffolded material tested.
[ΔΔ]Iso = Isothermal heating at the listed temperature.

In the table, data show that the thermodynamics of hydrogen release is altered for bulk-scaffolded hydrogen storage and releasing materials at the various loadings. For example, temperature at which hydrogen is released from the mesoporous supports of the bulk-scaffolded materials is typically reduced; enthalpy of reaction can also be altered or reduced. In the table, addition of aluminum to the support material also modifies the surface chemistry of the silica supports. Hydrogen release is still achieved, although enthalpy of reaction is altered. Onset temperatures for release of the hydrogen change as a function of loading and are also dependant on the nature of the scaffold surface. Onset temperatures gradually increase as loading on the scaffold increases, but are always lower than release temperatures of the neat material.

Example 8

Hydrogen Release Temperature

1:1 Composite

AB:SBA-C

Figure 10:
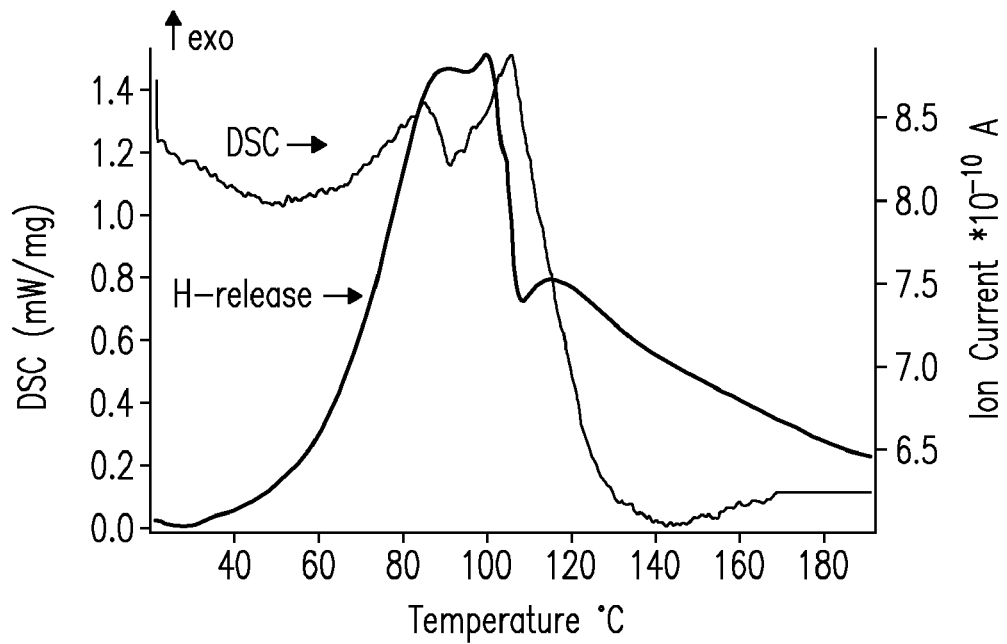
FIG. 10 plots the change in heat (measured by DSC) and release of hydrogen [measured by mass spectrometry (MS)] from the (1:1) AB:SBA-C material as a function of temperature.

In another experiment, a 1:1 bulk-scaffolded hydrogen storage and releasing material composed of AB and SBA-C (mesoporous carbon) was prepared. The mesoporous carbon support was prepared using a nanocasting process described, e.g., by Jun et al. (in *J. Am. Chem. Soc.* 2000, 122, 10712) and Joo et al. in (*Nature* 2001, 412, 169), which references are incorporated herein by reference. In this process, a silicate template, SBA-15, was impregnated with a carbon source (e.g., resorcinol/formaldehyde or another carbon source) and pyrolyzed to structure the mesoporous carbon. Silica in the template was then dissolved leaving the SBA-C mesoporous carbon support behind. AB was then dissolved in solution in tetrahydrofuran solvent and applied to the mesoporous carbon support, forming the AB:SBA-C bulk-scaffolded hydrogen storage and releasing material. FIG. 10 plots the change in heat (measured by DSC) and release of hydrogen [measured by mass spectrometry MS)] from the (1:1) AB:SBA-C material as a function of temperature. In the figure, release of hydrogen from the bulk scaffolded material begins as low as 30° C. below the temperature corresponding to the neat material. Thus, bulk-scaffolded AB:SBA-C material also enhances hydrogen release properties of ammonia borane. Results demonstrate that hydrogen release can be achieved at much lower temperatures compared to the neat materials alone.

We claim:

1. A method for making a bulk-scaffolded hydrogen storage and releasing material, characterized by the steps of:
combining a preselected ratio of at least one hydrogen storage and releasing compound with a porous support by:
mixing said at least one hydrogen storage and releasing compound in a solvent to form a solution;
wetting said porous support with said solution; and
drying said porous support to form said bulk-scaffolded hydrogen storage and releasing material.

2. The method of claim 1 wherein said at least one hydrogen storage and releasing compound includes a member selected from the group consisting of Li, Be, B, C, N, O, F, Na, Mg, Al, Si, P, and combinations thereof.

3. The method of claim 1, wherein said porous support is a mesoporous material having a pore size ranging between 2 nm to 50 nm.

4. The method of claim 1, wherein porous support comprises at least 20% porosity by volume.

5. The method of claim 1, wherein said porous support comprises mesoporous silica.

6. The method of claim 1, wherein said porous support comprises carbon.

7. A bulk-scaffolded hydrogen storage and releasing material, comprising:
a preselected ratio of at least one hydrogen storage and releasing compound combined with a mesoporous silica support, said bulk-scaffolded hydrogen storage and releasing material being capable of releasing a bulk quantity of hydrogen at a greater rate and a lower temperature than said at least one compound alone.

8. The bulk-scaffolded hydrogen-storage and releasing material of claim 7, wherein said at least one hydrogen storage and releasing compound includes a member selected from the group consisting of Li, Be, B, C, N, O, F, Na, Mg, Al, Si, P, and combinations thereof.

9. The bulk-scaffolded material of claim 7, wherein said mesoporous silica support has a pore size between 2 nm to 50 nm.

10. The bulk-scaffolded material of claim 7, herein said mesoporous silica support comprises at least 20% porosity by volume.

11. The bulk scaffolded material of claim 7, wherein said bulk-scaffolded hydrogen storage and releasing material releases hydrogen at a temperature at least ten degrees lower than said hydrogen storage and releasing compound alone.

12. The bulk-scaffolded material of claim 7, wherein said bulk-scaffolded hydrogen storage and releasing material releases hydrogen at a temperature below about 95° C.

13. The bulk-scaffolded material of claim 7, wherein said bulk-scaffolded hydrogen storage and releasing material releases hydrogen at a temperature below about 85° C.

14. The bulk-scaffolded material of claim 7, wherein the rate of hydrogen release from said bulk-scaffolded hydrogen storage and releasing material is at twice that of the rate of hydrogen release of the hydrogen storage and releasing compound alone.

15. The bulk-scaffolded material of claim 7, wherein the rate of hydrogen release from said bulk-scaffolded hydrogen storage and releasing material is at least 1 order of magnitude greater than the rate of hydrogen release of the hydrogen storage and releasing compound alone.

16. A hydrogen fuel source, comprising:
a bulk-scaffolded hydrogen storage and releasing material having a preselected ratio of at least one hydrogen storage and releasing compound and a mesoporous silica support, said bulk-scaffolded hydrogen storage and releasing material being capable of releasing a bulk quantity of hydrogen at a greater rate, a lower temperature, or a greater rate and a lower temperature as compared to said at least one compound alone.

17. A fuel cell system comprising the hydrogen fuel source of claim 16.

18. A combustion engine system comprising the hydrogen fuel source of claim 16.

19. An automobile comprising the hydrogen fuel source of claim 16.

20. A bulk-scaffolded hydrogen storage and releasing material, comprising:
a preselected ratio of at least one hydrogen storage and releasing compound combined with a porous carbon support, said bulk-scaffolded hydrogen storage and releasing material being capable of releasing a bulk quantity of hydrogen at a greater rate and a lower temperature than said at least one compound alone.

21. The bulk-scaffolded hydrogen-storage and releasing material of claim 20, wherein said at least one hydrogen storage and releasing compound includes a member selected from the group consisting of Li, Be, B, C, N, O, F, Na, Mg, Al, Si, P, and combinations thereof.

22. The bulk-scaffolded material of claim 20, wherein said porous carbon support includes at least 20% porosity by volume.

23. The bulk scaffolded material of claim 20, wherein said bulk-scaffolded hydrogen storage and releasing material releases hydrogen at a temperature at least ten degrees lower than said hydrogen storage and releasing compound alone.

24. The bulk-scaffolded material of claim 20, wherein said bulk-scaffolded hydrogen storage and releasing material releases hydrogen at a temperature below about 95° C.

25. The bulk-scaffolded material of claim 20, wherein said bulk-scaffolded hydrogen storage and releasing material releases hydrogen at a temperature below about 85° C.

26. The bulk-scaffolded material claim 20, wherein the rate of hydrogen release from said bulk-scaffolded hydrogen storage and releasing material is at twice that of the rate of hydrogen release of the hydrogen storage and releasing compound alone.

27. The bulk-scaffolded material of claim 20, wherein the rate of hydrogen release from said bulk-scaffolded hydrogen storage and releasing material is at least 1 order of magnitude greater than the rate of hydrogen release of the hydrogen storage and releasing compound alone.

* * * * *

UNITED STATES PATENT AND TRADEMARK OFFICE
CERTIFICATE OF CORRECTION

PATENT NO. : 7,963,116 B2  Page 1 of 1
APPLICATION NO. : 12/435268
DATED : June 21, 2011
INVENTOR(S) : S. Thomas Autrey et al.

It is certified that error appears in the above-identified patent and that said Letters Patent is hereby corrected as shown below:

Col. 13, Line 29: Replace "MCM-4TM" with "MCM-41TM"

Signed and Sealed this
Fourth Day of October, 2011

David J. Kappos
*Director of the United States Patent and Trademark Office*